(12) United States Patent
Buchter

(10) Patent No.: US 6,536,957 B1
(45) Date of Patent: Mar. 25, 2003

(54) INTEGRATED OPTICAL TRANSCEIVER ARRAY

(75) Inventor: Scott Buchter, Somerville, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/929,864

(22) Filed: Aug. 14, 2001

(51) Int. Cl.[7] .................................. G02B 6/36
(52) U.S. Cl. ........................ 385/89; 385/92; 385/33; 359/152
(58) Field of Search ................ 385/88–94, 14, 385/33; 359/131, 152, 154

(56) References Cited

U.S. PATENT DOCUMENTS

| | | |
|---|---|---|
| 4,707,064 A | 11/1987 | Dobrowolski et al. |
| 4,767,171 A | 8/1988 | Keil et al. |
| 5,416,624 A | 5/1995 | Karstensen |
| 5,883,730 A | 3/1999 | Coult et al. |
| 5,920,411 A | 7/1999 | Kuck et al. |
| 6,021,238 A | 2/2000 | Spaeth |
| 6,252,719 B1 | 6/2001 | Eichenbaum |
| 6,421,474 B2 * | 7/2002 | Jewell et al. .............. 385/14 |

* cited by examiner

*Primary Examiner*—Phan T. H. Palmer
(74) *Attorney, Agent, or Firm*—Banner & Witcoff, Ltd.

(57) ABSTRACT

An optical transceiver assembly comprises a plurality of optical signal sources for providing downstream signals and a plurality of photodetectors for detecting upstream signals. An optical module is disposed between the optical signal sources and the photodetectors, where the optical module includes a surface transmissive to either one of the downstream and upstream signals, and substantially reflective to the other of the downstream and upstream signals, diffractive regions for deflecting the downstream signals into the optical fibers and the upstream signals into the optical module. The optical module also includes diffractive regions for deflecting the downstream signals from the optical signal sources into the optical module and the upstream signals into the photodetectors. The optical module additionally includes an array of lenses for imaging the downstream signals into the optical module and into the optical fibers, and for imaging the upstream signals into the optical module and into the photodetectors.

30 Claims, 6 Drawing Sheets

INTEGRATED OPTICAL TRANSCEIVER ARRAY

FIELD OF THE INVENTION

This invention relates to optical communication devices and, in particular, to an integrated optical transceiver array.

BACKGROUND OF THE INVENTION

Optical fibers used in communication applications are typically configured as a ribbon cable containing a linear array of optical fibers. When an optical fiber ribbon cable is terminated at a transceiver assembly, for example, upstream signals are transmitted from the optical fibers to photodetectors, and downstream signals produced by laser signal devices are transmitted from the laser devices to the optical fibers. The signal path in a conventional transceiver geometry usually requires a fan-out of the signal paths from the optical fiber ribbon cable to the transceivers with the result that the supporting structure for the transceivers is physically wider than the optical fiber ribbon cable. This limits the number of optical fiber cables which can be brought into a communication switching device, for example.

What is needed is a system for providing smaller transceiver geometry for increasing the number of communication links which can be brought into a central communication facility.

SUMMARY OF THE INVENTION

The present invention provides an integrated optical transceiver assembly for mating with optical fibers terminating in a connector. The optical transceiver assembly includes an adapter for mating with the optical fiber connector, a plurality of optical signal sources for providing downstream signals and a plurality of photodetectors for detecting upstream signals. An optical module is disposed between the optical signal sources and the photodetectors, where the optical module couples the downstream signals to the optical fibers and the upstream signals to the photodetectors. The optical module includes a surface transmissive to either one of the downstream and upstream signals, and substantially reflective to the other of the downstream and upstream signals, diffractive regions for deflecting the downstream signals into the optical fibers and the upstream signals into the optical module. The optical module also includes diffractive regions for deflecting the downstream signals from the optical signal sources into the optical module and the upstream signals into the photodetectors. Additionally, the optical module includes an array of lenses for imaging the downstream signals into the optical module and into the optical fibers, and for imaging the upstream signals into the optical module and into the photodetectors.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
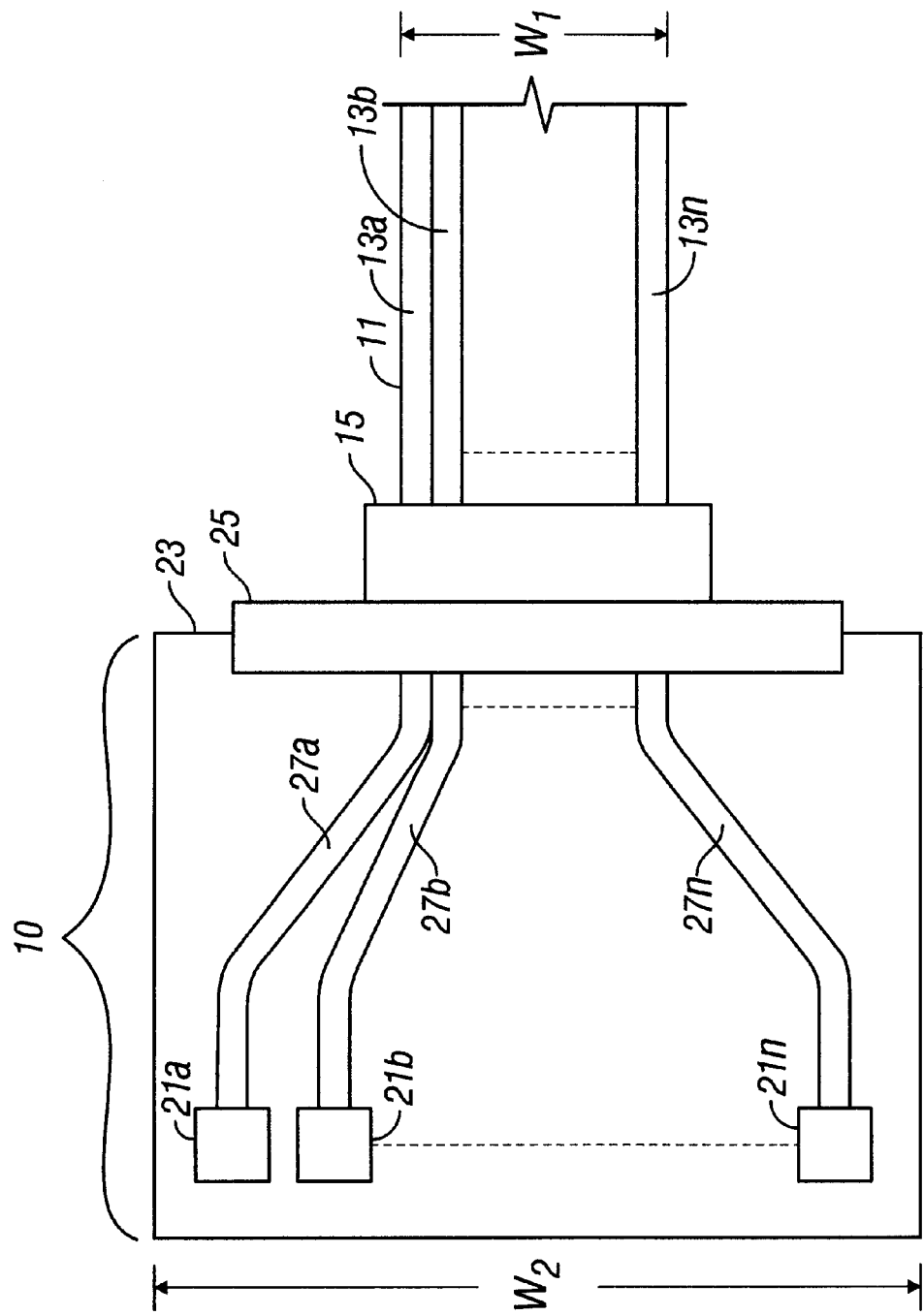
FIG. 1 is a diagrammatical plan view of a conventional board showing a plurality of discrete optical transceivers connected to an optical fiber ribbon cable.

There is shown in FIG. 1 a simplified diagram (not drawn to scale) of a conventional optical transceiver assembly 10 including a board 23 upon which are surface-mounted a plurality of optical transceivers 21a through 21n. An optical ribbon cable 11 includes a plurality of optical fibers 13a through 13n which are terminated in a connector 15. The number of optical fibers comprising the optical ribbon cable 11 may be determined by commercially-available components and prevailing manufacturing standards. For an application in which the connector 15 is an MTP connector, for example, the optical ribbon cable 11 would comprise twelve optical fibers. The connector 15 mates with a receptacle 25 mounted to the board 23. Signal paths between the receptacle 25 and the optical transceivers 21a through 21n are provided by a plurality of signal paths, such as fiber optical leads 27a through 27n, respectively. When the connector 15 is mated to the receptacle 25, a signal path is thus provided from each optical fiber 13a through 13n to a corresponding optical transceiver 21a through 21n and, accordingly, signals can be transmitted from or received at the optical transceivers 21a through 21n via the optical fibers 13a through 13n.

With such a configuration, it can be appreciated that the width of the board 23 containing the transceiver array 21a through 21n, here denoted by the dimension $W_2$, can be several times the lateral width of the optical ribbon cable 11, here denoted by the dimension $W_1$. Accordingly, the number of ribbon cables 11 which can be brought into a high-traffic communication environment, such as a central office distribution facility, is limited by the space available to accommodate the associated boards 23.

Figure 2:
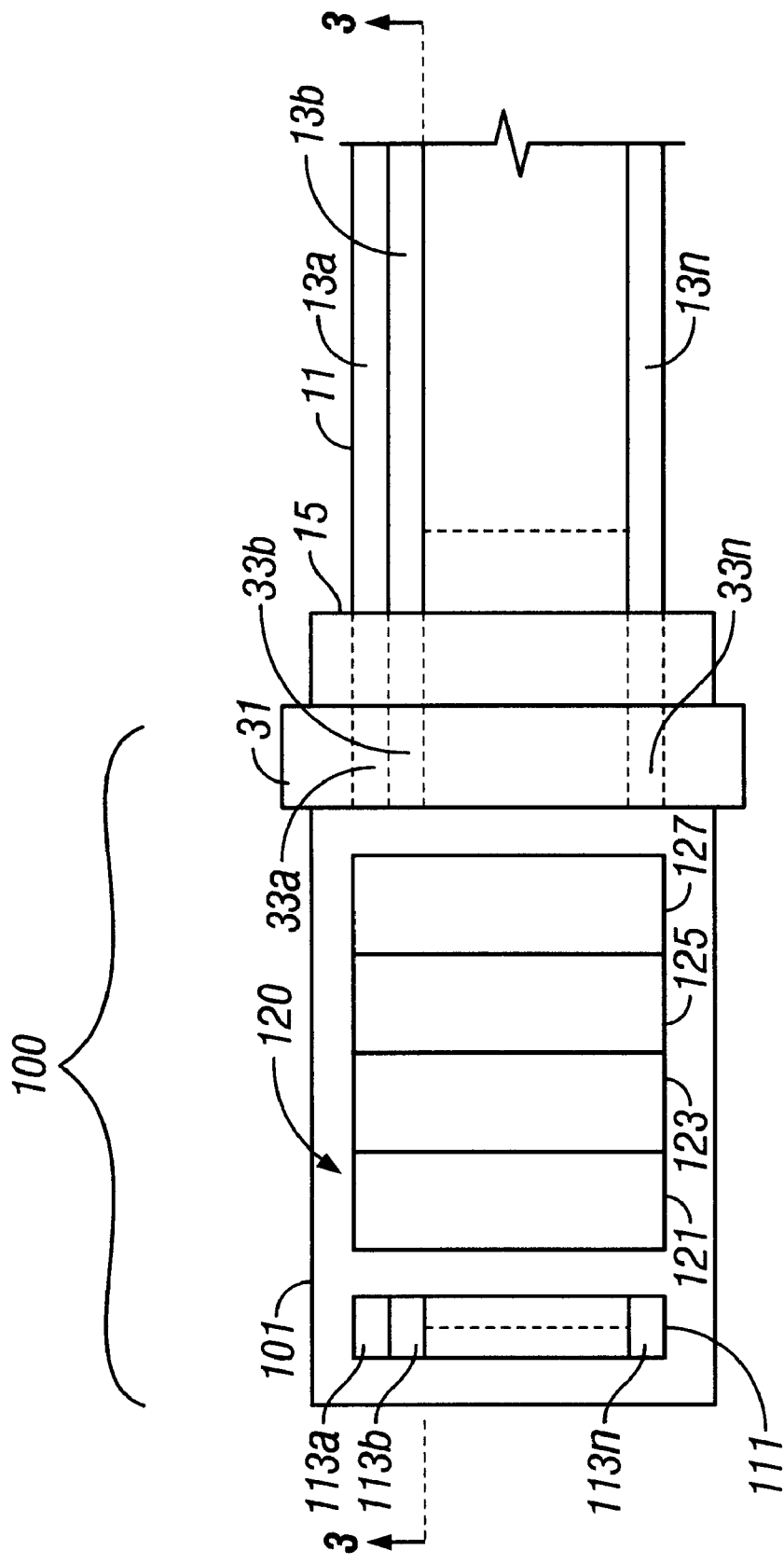
FIG. 2 is a diagrammatical plan view of an integrated optical transceiver assembly in accordance with the present invention connected to an optical fiber ribbon cable.

There is shown in FIG. 2 a preferred embodiment of an integrated optical transceiver assembly 100 attached to the optical ribbon cable 11 and the connector 15. The integrated optical transceiver assembly 100 includes a photodetector array 111 having a plurality of photodetectors 113a through 113n. That is, the number of photodetectors 113a through 113n in the photodetector array 111 is preferable the same as the number of optical fibers 13a through 13n in the optical ribbon cable 11. Thus, a photodetector is provided for each optical fiber in the optical ribbon cable 11 for detection of upstream communication signals. The width of the photodetector array 111 is substantially the same as the width of the optical ribbon cable 11. The optical ribbon cable 11 and the connector 15 mate with an adapter 31 attached to a transceiver base 101. The adapter 31 provides signal paths 33a through 33n each from a respective one of the optical fibers 13a through 13n to a respective transceiver device on the transceiver base 101, as described in greater detail below. The signal paths 33a through 33n preferably comprise optical fiber segments. The adapter 31 secures and positions each signal path 33a through 33n so as to provide for coupling of signals passing between each optical fiber 13a through 13n to a corresponding signal path 33a through 33n when the connector 15 is mated with the adapter 31.

The integrated optical transceiver assembly 100 also includes a unitary optical module 120 which is comprised of a diffractive optical element block 121, a filter block 123, a diffraction block 125, and a lens array block 127 arranged as shown. One function of the optical module 120 is to couple the plurality of signals from the optical fibers 13a through 13n into the respective photodetectors 113a through 113n. In contrast to conventional coupling configurations, no fan-out of signal paths is required with the optical module 120. It can thus be appreciated by one skilled in the relevant art that the lateral width of the integrated optical transceiver assembly 100 can be substantially the same as the width of the optical ribbon cable 11, and that this configuration allows for a greater number of optical ribbon cables to be routed into a central distribution device (not shown) than if a conventional configuration were used.

Figure 3:
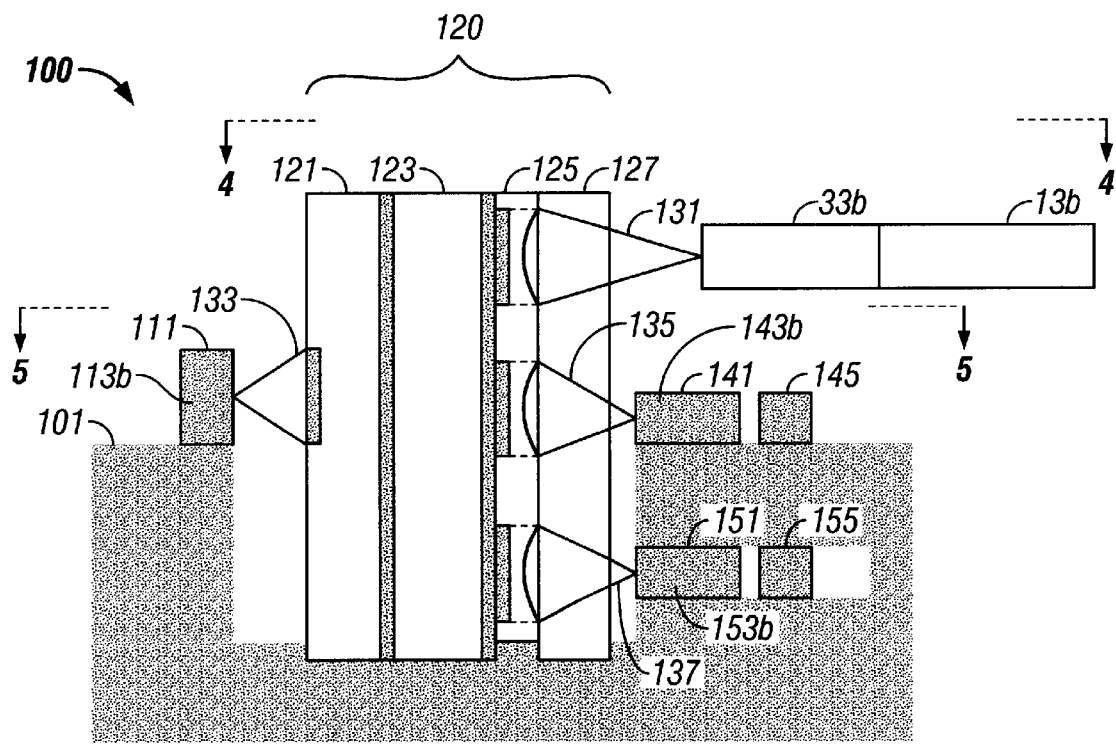
FIG. 3 is a diagrammatical sectional view of a the integrated optical transceiver of FIG. 2.
Figure 4:
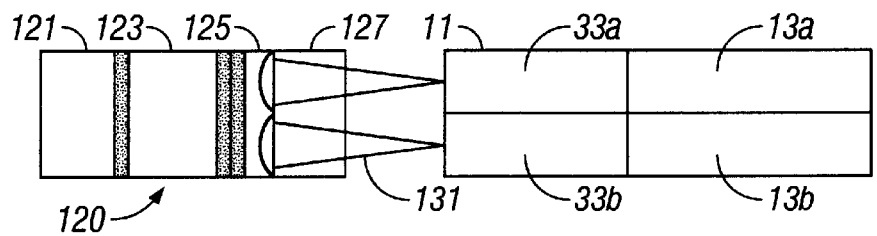
FIG. 4 is a diagrammatical plan view of the integrated optical transceiver section of FIG. 3.

The functions of the optical blocks 121 through 127 can best be described with reference to FIGS. 3 through 5. FIG. 3 is a cross-sectional diagram of the optical fibers 13a and 13b of the optical ribbon cable 11, and a portion of the integrated optical transceiver assembly 100 including the photodetectors 113a and 113b of the photodetector array 111, as defined by the section arrows 3—3 in FIG. 2. The adapter 31 and the connector 15 are not shown in FIG. 3, for sake of clarity. FIG. 4 is a partial top view of the diagrammatical illustration of FIG. 3, as defined by the view arrows 4—4 in FIG. 3, and FIG. 5 is a partial sectional view of the diagrammatical illustration of FIG. 3, as defined by the section arrows 5—5 in FIG. 3.

Figure 5:
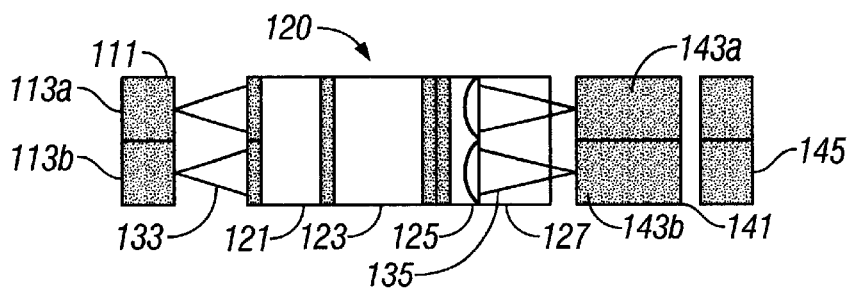
FIG. 5 is a diagrammatical sectional view of the integrated optical transceiver section of FIG. 3.

In the example provided, the integrated optical transceiver assembly 100 further includes a first signal source array 141 comprising a first plurality of laser devices 143a through 143n, where only the laser devices 143a and 143b are shown in FIG. 5, and a second signal source array 151 comprising a second plurality of laser devices 153a through 153n, where only the laser device 153b is shown in FIG. 3. It should be understood that, in a preferred embodiment, the number of laser devices 143a through 143n in the first signal source array 141 is the same as the number of optical fibers in the optical ribbon cable 11. Similarly, the number of laser devices 153a through 153n in the second signal source array 151 is the same as the number of optical fibers in the optical ribbon cable 11. In the integrated optical transceiver assembly 100, the first plurality of laser devices 143a through 143n and the second plurality of laser devices 153a through 153n can be single bar semiconductor laser arrays, with the respective array axes being oriented substantially parallel to the plane defined by the optical ribbon cable 11, and where the lateral widths of the laser arrays are substantially the same as the width of the optical module 120.

As shown in FIG. 3, a first source monitor array 145 and a second source monitor array 155 may be included in the integrated optical transceiver assembly 100 to monitor performance and functioning of the respective signal source array 141 and 151, as is well-known in the relevant art. The optical module 120, the photodetector array 11, the signal source arrays 141 and 151, and the source monitor arrays 145 and 155 are mounted to the transceiver base 101 to provide stability and maintain relative optical alignment.

As shown in FIGS. 3 and 4, a beam 131 is used to represent both an upstream signal transmitted via the optical fiber 13b and the signal path 33b, and a downstream signal emitted from a source laser device and coupled into the optical fiber 13b via the signal path 33b. When an upstream signal is present, the beam 131 passes though the lens array block 127, the diffraction block 125, the filter block 123, and the diffractive optical element block 121, and emerges as a detected beam 133 at the photodetector 113b (in FIGS. 3 and 5), as described in greater detail below. In the example provided, the detected beam 133 is transmitted in a direction substantially parallel to the direction of transmission of (an upstream) beam 131. When a downstream signal is present, the beam 131 results from a first signal beam 135 emitted by the first source laser device 143b, and/or from a second signal beam 137 emitted by the second source laser device 153b. Both signal beams 135 and 137 are incident on the optical module 120, pass though the lens array block 127, through the diffraction block 125, and through the filter block 123, as represented by the beam 131 and described in greater detail below. In the example provided, the first and second signal beams 135 and 137 are initially emitted in a direction substantially anti-parallel to the direction of transmission of the downstream beam 131.

In the preferred embodiment, the first source laser device 143b operates at 1550 nm for analog transmission, and the second source laser device 153b operates at 1490 nm for digital transmission. The detected beam 133 is a signal at 1310 nm transmitted upstream from a remote source (not shown). The 1550 nm and the 1490 nm signals are multiplexed by the optical module 120 for downstream transmission via the optical fiber 13b, and the 1310 nm signal is demultiplexed for detection in upstream transmission. These operations can be best described with reference to FIGS. 6 and 7 in which are shown a downstream transmission and an upstream emission, respectively, in the integrated optical transceiver assembly 100. It should be understood that upstream and downstream transmissions can occur simultaneously in the integrated optical transceiver assembly 100, and that the two separate diagrams, one showing upstream and one showing downstream transmissions, are presented for the sake of clarity.

Figure 6:
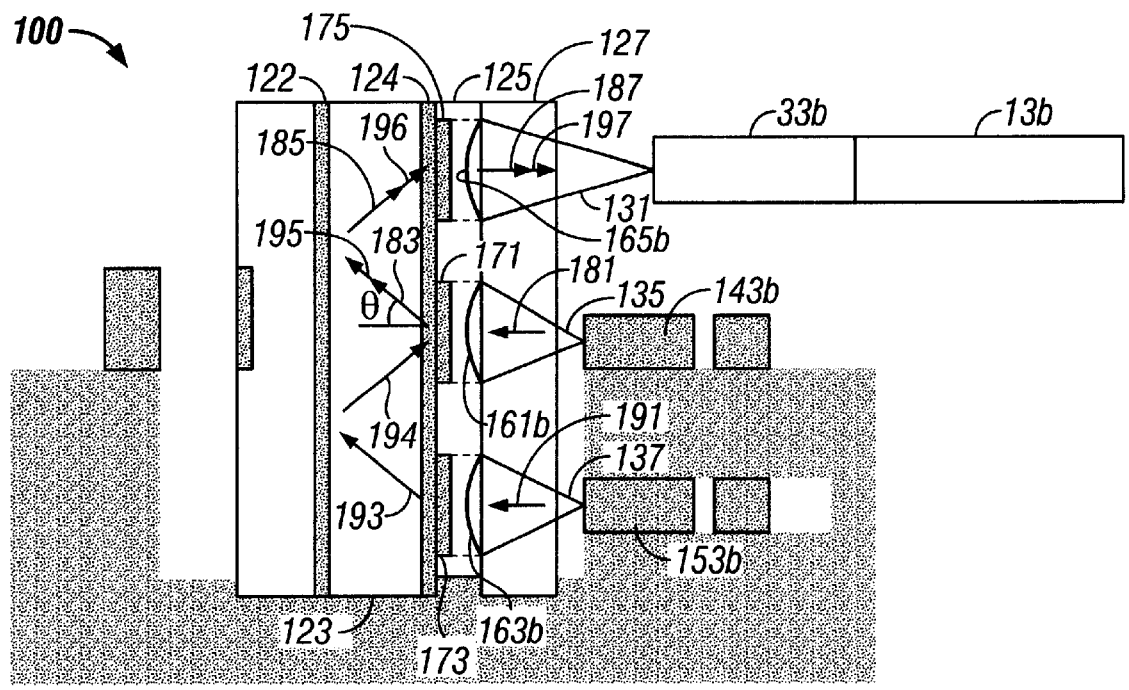
FIG. 6 shows the transmission paths taken by downstream signals in the integrated optical transceiver section of FIG. 3.

In downstream transmission, shown in FIG. 6, the first signal beam 135 and the second signal beam 137 are emitted by the source laser device 143b and the source laser device 153b, respectively. The first signal beam 135 passes into the lens array block 127, as indicated by arrow 181, and is imaged onto a first input diffractive element 171 by a first source focusing lens 161b. The first input diffractive element 171 functions to pass the first-order emission of the first signal beam 135 into the filter block 123 at an angle ($\theta$) transverse to the transmission path of the first signal beam 135. An internal transverse reflection of the emission having the wavelength of the first signal beam 135 occurs at a first multicoated optical surface 122, as indicated by arrow pair 183–185. From the filter block 123, the first-order emission is incident upon an output diffractive element 175 which serves to transversely deflect the first-order emission into an output focusing lens 165b, as indicated by arrow 187. The output focusing lens 165b optically couples the first-order emission of the first signal beam 135 into the optical fiber 13b via the signal path 33b.

Similarly, the second signal beam 137 passes into the lens array block 127, as indicated by arrow 191, and is thereby imaged onto a second input diffractive element 173 by a second source focusing lens 163b. A first-order emission of the second signal beam 137 passes into the filter block 123 where internal transverse reflections of the emission having the wavelength of the second signal beam 137 occur by means of the first multicoated optical surface 122 and a second multicoated optical surface 124, as indicated by arrow pairs 193–194, 194–195, and 195–196. From the filter block 123, the first-order emission of the second signal beam 137 is transversely deflected via the output diffractive element 175 into the output focusing lens 165b as indicated by arrow 197. The multicoated optical surfaces 122 and 124 may comprise multilayer thin film optical filters as well-known in the relevant art, so as to provide for selective reflection and transmission of signals of different wavelengths. The reflective and transmissive properties of the multicoated optical surfaces 122 and 124 are described in greater detail below.

Figure 7:
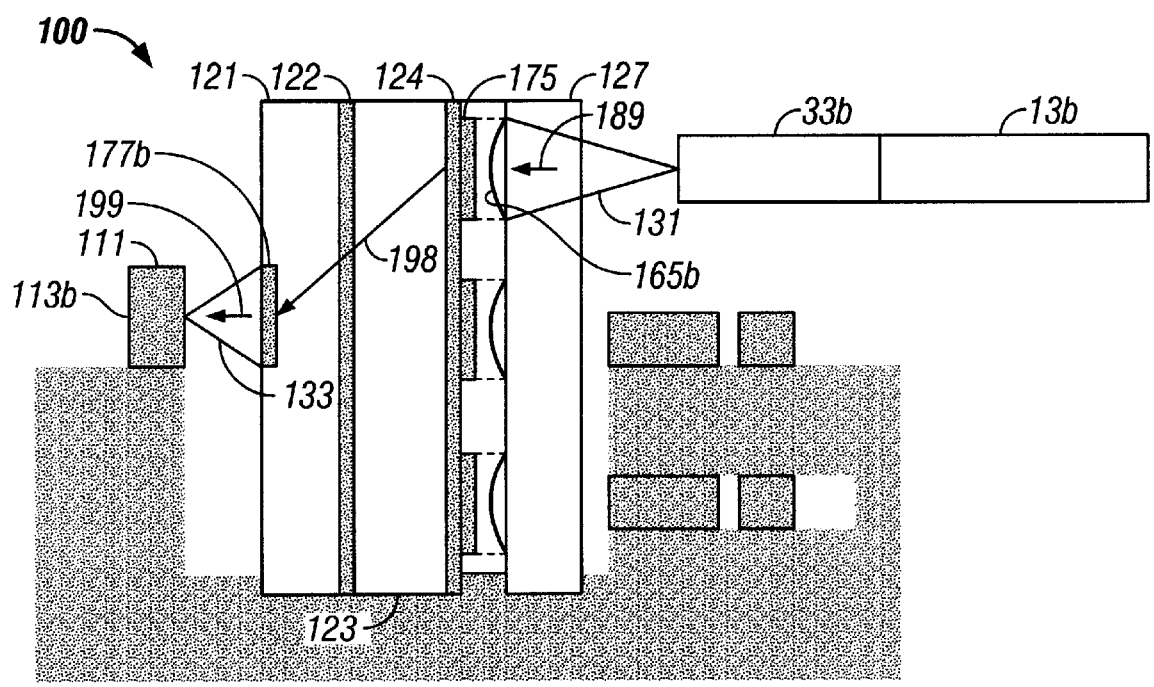
FIG. 7 shows the transmission path taken by an upstream signal in the integrated optical transceiver section of FIG. 3.

In upstream transmission, shown in FIG. 7, the beam 131 passes into the lens array block 127, as indicated by arrow 189, and is imaged onto the output diffractive element 175 by the output focusing lens 165b. The output diffractive element 175 transversely deflects a first-order emission of the beam 131 into the filter block 123 and onto a diffractive optical element 177b, as indicated by arrow 198. The multicoated optical surfaces 122 and 124 are highly transmissive to upstream transmission radiation, for example, signals at 1310 nm, so as to provide for minimal attenuation of the detected beam 133. The first-order emission of the beam 131 is outputted from the diffractive optical element block 121 as the detected beam 133, as indicated by arrow 199. The diffractive optical element 177b serves to transversely deflect the first-order emission of the upstream signal to the photodetector array 111 and to image the first-order emission onto the photodetector 113b.

Figure 8:
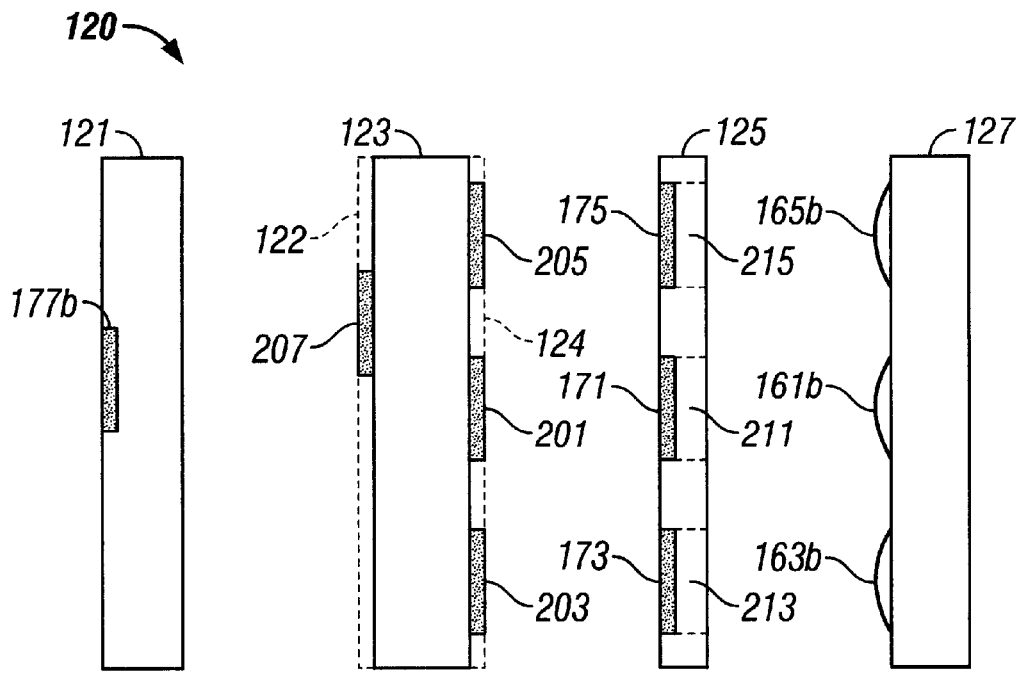
FIG. 8 is an exploded view of a preferred embodiment of the optical module section of FIG. 3.
Figure 9:
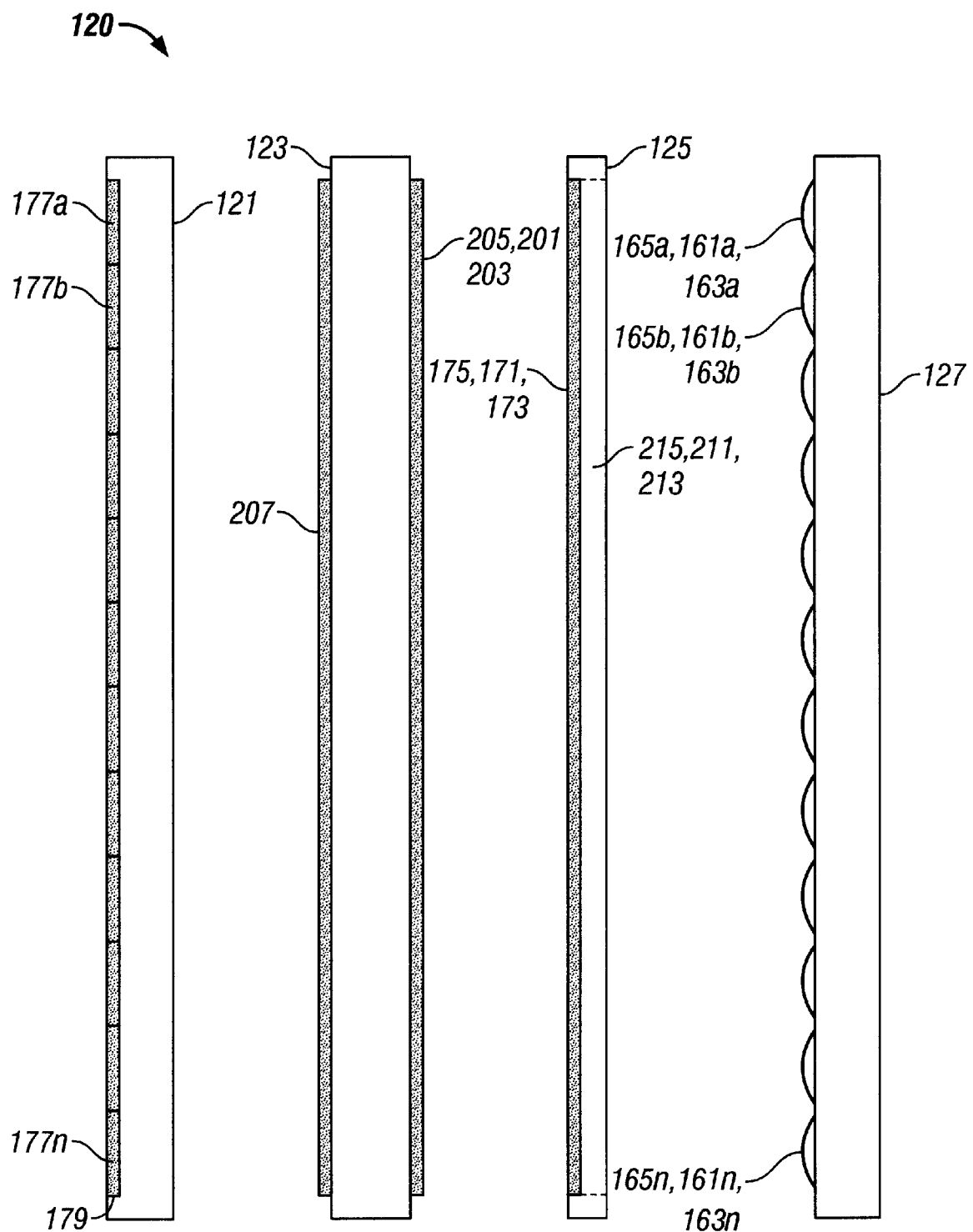
FIG. 9 is a plan view of the optical module section of FIG. 8.

As best seen in FIG. 8 which provides a side exploded view of a section of the optical module 120, and in FIG. 9 which provides a top exploded view of the entire optical module 120, the diffractive optical element 177b is part of a diffractive optical element array 179 formed in the diffractive optical element block 121 using a conventional fabrication technique. Each diffractive optical element 177a through 177n images the upstream first-order emissions from a corresponding optical fiber 13a through 13n onto a corresponding photodetector 113a through 113n (not shown). Note that while, in the example provided, the diffractive optical element array 179 comprises a 1×12 array of diffractive optical elements 177a through 177n, corresponding to a 1×12 array of optical fibers 13a through 13n in the optical ribbon cable 11 (not shown), the present invention is not limited to a configuration of twelve optical fibers but may be applied to configurations with more or fewer optical fibers.

In addition, the first multicoated optical surface 122 is highly reflective to downstream radiation, for example, signals at 1550 nm and 1490 nm, so as to produce the internal transverse reflections represented by arrow pairs 193–194, 194–195, and 183–185 (in FIG. 6). Alternatively, the first multicoated optical surface 122 may comprise a multilayer thin film optical filter highly reflective to downstream radiation with a multilayer thin film optical filter upstream transmission window 207 highly transmissive to the upstream radiation so as to provide for throughput of the signal represented by arrow 198 (in FIG. 7).

The multicoated optical surface 124 comprises a heterogeneous layer including three multilayer thin film optical filter regions: a first source transmission window 201, a second source transmission window 203, and a downstream transmission window 205. The first source transmission window 201 is highly transmissive to downstream radiation emitted by the first source laser device 143b so as to allow the first signal beam 135 to pass into the filter block 123, represented by arrow 181. The first source transmission window 201 is also highly reflective to downstream radiation emitted by the second source laser device 153b so as to provide for internal transverse reflection represented by arrow pair 194–195. The second source transmission window 203 is highly transmissive to downstream radiation emitted by the second source laser device 153b so as to allow the second signal beam 137 to pass into the filter block 123, represented by arrow 191 (see FIG. 6).

The diffraction block 125 includes the output diffractive element 175, the first input diffractive element 171, and the second input diffractive element 173. Each diffractive element 171, 173, and 175 is a diffractive region, or strip, formed in the diffraction block 125 using fabrication techniques known in the relevant art. The respective lengths of the diffractive elements 171, 173, and 175 are substantially the same as the length of corresponding lens arrays in the lens array block 127.

The output diffractive element 175 is located on the diffraction block 125 so as to be positioned against the downstream transmission window 205 and extending adjacent a corresponding 1×12 array of output focusing lenses 165a through 165n when the optical blocks 121 through 127 are assembled to form the optical module 120. There may additionally be formed in the diffraction block 125 a cavity 215 opposite the output diffractive element 175 to provide clearance for the output focusing lenses 165a through 165n.

Similarly, the first input diffractive element 171 is located on the diffraction block 125 so as to be positioned against the first source transmission window 201 and adjacent a corresponding 1×12 array of first source focusing lenses 161a through 161n. A cavity 211 provides clearance for the corresponding first source focusing lens 161a through 161n when assembled into the optical module 120. Additionally, the second input diffractive element 173 is located on the diffraction block 125 so as to be positioned against the corresponding second downstream transmission window 203 and adjacent the corresponding array of second source focusing lenses 163a through 163n, with a cavity 213 for the second source focusing lens 163a through 163n.

In the example provided, the lens array block 127 includes a 3×12 array of lenses comprising a 1×12 array of first source focusing lenses 161a through 161n, a 1×12 array of second source focusing lenses 163a through 163n, and a 1×12 array of output focusing lenses 165a through 165n. The array of output focusing lenses 165a through 165n is positioned on the lens array block 127 such that each output focusing lens 165a through 165n is positioned adjacent a corresponding signal path 33a through 33n (not shown). Similarly, the array of first source focusing lenses 161b is positioned on the lens array block 127 to be adjacent a corresponding first source laser device 143a through 143n (not shown). Additionally, the array of second source focusing lenses 163a through 163n is positioned on the lens array block 127 to be adjacent a corresponding second source laser device 153a through 153n (not shown). It can be appreciated by one skilled in the relevant art that the photodetector 113b, the diffractive optical element 177b, the focusing lenses 161b, 163b, and 165, and the source laser devices 143b and 153b define a common planar volume which includes portions of transmission windows 201–207 and diffractive regions 211–213.

Figure 10:
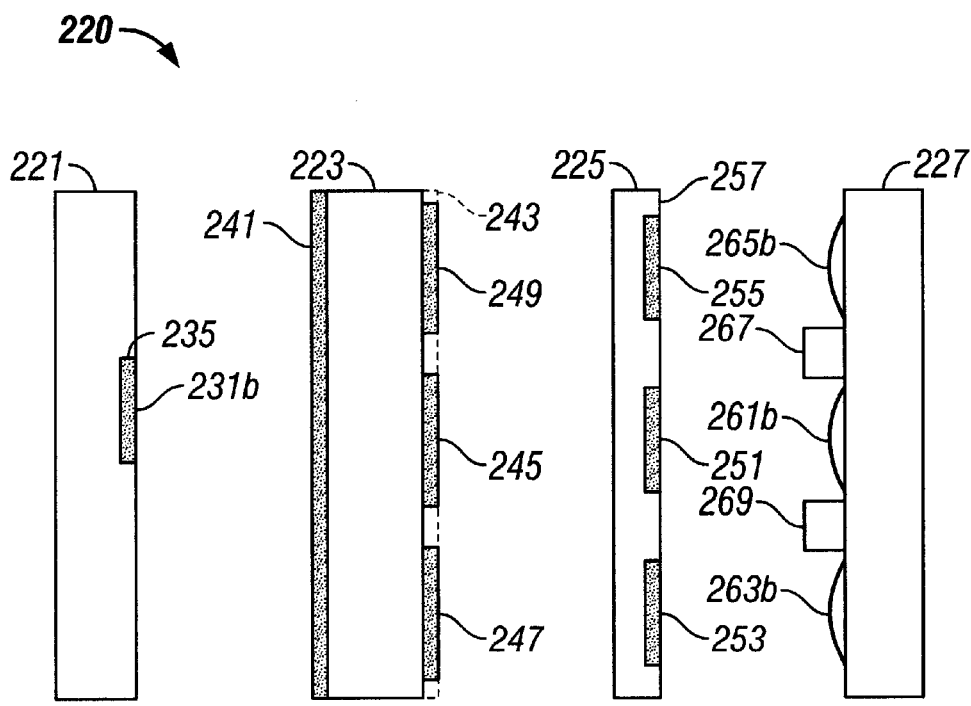
FIG. 10 is an exploded view of an alternative embodiment of the optical module of FIG. 8.

In an alternative embodiment, shown in FIG. 10, an optical module 220 includes a diffractive optical element block 221, a filter block 223, a diffraction block 225, and a lens array block 227 arranged as shown. The diffractive optical element block 221 includes a diffractive optical element array 235, formed in a surface 233, of which a diffractive optical element 231b is seen in the diagram. The filter block 223 includes a first multicoated optical surface 241 highly reflective to the downstream radiation and highly transmissive to the upstream radiation. In the optical module 220, the first multicoated optical surface 241 is disposed against the surface 233 of the diffraction optical element block 221. The filter block 223 also includes a multicoated optical surface 243 comprising a first source transmission window 245, a second source transmission window 247, and a downstream transmission window 249 having the transmissive and reflective properties of, respectively, the first source transmission window 201, the second source transmission window 203, and the downstream transmission window 205 of the filter block 123 described above.

The diffraction block 225 includes an output diffractive element 255, a first input diffractive element 251, and a second input diffractive element 253 corresponding to the output diffractive element 175, the first input diffractive element 171, and the second input diffractive element 173, respectively, of the diffraction block 125 described above. Each diffractive element 251, 253, and 255 is a diffractive region, or strip, formed in the diffraction block 225 using fabrication techniques known in the relevant art. The lens array block 227 includes an array of lenses in three rows, of which only an output focusing lens 265b, a first source focusing lens 261b, and a second source focusing lens 263b are shown. Because the diffractive elements 251, 253, and 255 are formed in a surface 257 which is adjacent to the array of lenses in the lens array block 227, there may be provided spacers 267 and 269 to maintain the proper focusing distance between the array of lenses, including the lenses 261b, 263b, and 265b, and the diffractive element 251, 253, and 255.

While the invention has been described with reference to particular embodiments, it will be understood that the present invention is by no means limited to the particular constructions and methods herein disclosed and/or shown in the drawings, but also comprises any modifications or equivalents within the scope of the claims. For example, an integrated transceiver assembly may include various combinations of the following configurations: i) two sets of photodetectors and one array of signaling lasers, ii) one set of photodetectors and one array of lasers, iii) a DOE array at one or more laser arrays, iv) a diffraction element and a lens combination at the photodetector array, v) more than two laser arrays or photodetectors, vi) photodetectors on the near (i.e., optical-fiber) side of the optical module, and vii) one or more laser source arrays on the far side of the optical module.

What is claimed is:

1. An integrated optical transceiver assembly suitable for transmitting downstream signals and receiving upstream signals when mated to a plurality of optical fibers terminating in a connector, said optical transceiver assembly comprising:
   a first plurality of optical signal sources for providing the downstream signals;
   a plurality of photodetectors for detecting the upstream signals; and
   an optical module disposed between said first plurality of optical signal sources and said first plurality of photodetectors, said optical module for coupling the downstream signals to the plurality of optical fibers, and for coupling the upstream signals from the plurality of optical fibers to said plurality of photodetectors, said optical module including at least one diffractive region and a plurality of lenses for imaging the downstream signals from said optical module into the plurality of optical fibers.

2. The optical transceiver assembly of claim 1 further comprising an optical surface substantially transmissive to one of the downstream signals and the upstream signals, and substantially reflective to the other one of the downstream signals and the upstream signals.

3. The optical transceiver assembly of claim 2 wherein said optical surface comprises a multilayer thin film optical filter.

4. The optical transceiver assembly of claim 1 further comprising a second plurality of optical signal sources mounted to said transceiver base for providing the downstream signals.

5. The optical transceiver assembly of claim 4 further comprising an optical transmission window substantially transmissive to the downstream signals provided by one of the first plurality of optical signal sources and the second plurality of optical signal sources, and substantially reflective to the downstream signals provided by the other one of the first plurality of optical signal sources and the second plurality of optical signal sources.

6. The optical transceiver assembly of claim 1 further comprising a transceiver base including an adapter for mating with the connector, said adapter having a plurality of signal paths configured for optically coupling with respective optical fibers terminating in the connector.

7. The optical transceiver assembly of claim 6 wherein said plurality of signal paths comprise a plurality of optical fiber segments.

8. The optical transceiver assembly of claim 1 wherein said at least one diffractive region comprises a diffractive region for deflecting the upstream signals from said optical module into said plurality of photodetectors.

9. The optical transceiver assembly of claim 1 wherein said at least one diffractive region comprises a plurality of diffractive optical elements.

10. The optical transceiver assembly of claim 1 wherein said first plurality of optical signal sources comprises a laser array.

11. The optical transceiver assembly of claim 1 further comprising a second plurality of photodetectors for detecting the upstream signals.

12. The optical transceiver assembly of claim 1 wherein said plurality of lenses comprises a lens array.

13. The optical transceiver assembly of claim 1 further comprising a plurality of lenses for imaging the downstream signals from said first plurality of optical signal sources into said optical module.

14. The optical transceiver assembly of claim 1 further comprising a plurality of lenses for imaging the upstream signals from the plurality of optical fibers into said optical module.

15. The optical transceiver assembly of claim 1 further comprising a plurality of lenses for imaging the upstream signals from said optical module into said plurality of photodetectors.

16. The optical transceiver assembly of claim 1 wherein said at least one diffractive region comprises an output diffractive region for deflecting the downstream signals from said optical module into the plurality of optical fibers and for deflecting the upstream signals from the plurality of optical fibers into said optical module.

17. The optical transceiver assembly of claim 1 wherein said at least one diffractive region comprises an input diffractive region for deflecting the downstream signals from said first plurality of optical signal sources into said optical module.

18. A method for communicating using an array of optical fibers, said method comprising the steps of:
   providing a plurality of downstream signals from an array of source laser devices;
   imaging said plurality of downstream signals onto an input diffractive region to produce a plurality of downstream first-order emissions;
   reflecting said plurality of downstream first-order emissions to an output diffractive region;
   deflecting, via said output diffractive region, said plurality of reflected downstream first-order emissions to an array of lenses; and
   coupling, via said array of lenses, said plurality of deflected downstream first-order emissions to the array of optical fibers.

19. The method of claim 18 further comprising the steps of:
   receiving a plurality of upstream signals via the array of optical fibers;
   imaging, via said array of lenses, said plurality of upstream signals onto said output diffractive region to produce a plurality of upstream first-order emissions;
   deflecting, via an array of diffractive optical elements, said plurality of upstream first-order emissions to an array of photodetectors; and
   imaging, via said array of diffractive optical elements, said plurality of upstream first-order emissions onto said array of photodetectors.

20. The method of claim 19 wherein said step of reflecting said plurality of downstream first-order emissions comprises the step of providing an upstream transmission window substantially transmissive to said plurality of upstream first-order emissions and substantially reflective to said plurality of downstream first-order emissions, said upstream transmission window disposed in the transmission paths of said plurality of upstream first-order emissions.

21. The method of claim 18 further comprising the steps of:
   providing a second plurality of downstream signals from a second array of source laser devices;
   imaging said second plurality of downstream signals onto a second input diffractive region to produce a second plurality of downstream first-order emissions;
   reflecting said second plurality of downstream first-order emissions to said output diffractive region;
   deflecting, via said output diffractive region, said second plurality of reflected downstream first-order emissions to said array of lenses; and
   coupling, via said array of lenses, said second plurality of deflected downstream first-order emissions to the array of optical fibers.

22. The method of claim 21 wherein said step of reflecting said second plurality of downstream first-order emissions comprises the step of providing a source transmission window substantially transmissive to said plurality of downstream first-order emissions and substantially reflective to said second plurality of downstream first-order emissions.

23. The method of claim 18 wherein said step of imaging said plurality of downstream signals comprises the step of focusing said plurality of downstream signals via an array of focusing lenses.

24. The method of claim 18 wherein said step of coupling said plurality of deflected downstream first-order emissions comprises the step of providing an array of signal paths disposed between said array of lenses and the array of optical fibers.

25. An optical module, suitable for coupling optical signals of a downstream wavelength from an array of optical signal sources into an array of optical fibers and for coupling optical signals of an upstream wavelength from the array of optical fibers into an array of photodetectors, said optical module comprising:
   a first optically-transparent substrate having a surface with a diffractive optical element array for optically coupling the signals of the upstream wavelength into the array of photodetectors;
   a second optically-transparent substrate having a first surface and a second surface,
      said second substrate first surface disposed against said first substrate and having an upstream transmission window substantially transmissive to radiation of the upstream wavelength and substantially reflective to radiation of the downstream wavelength,
      said second substrate second surface having a downstream transmission window substantially transmissive to radiation of the upstream and downstream wavelengths and a source transmission window substantially transmissive to radiation of the downstream wavelength;
   a third optically-transparent substrate disposed against said second substrate, said third substrate having a surface with an input diffractive region and an output diffractive region, said third substrate disposed against said second substrate such that said input diffractive region is proximate to said source transmission window and said output diffractive region is proximate to said downstream transmission window; and
   a fourth optically-transparent substrate disposed against said third substrate, said fourth substrate having a surface with an array of lenses such that: i) signals of the downstream wavelength emitted by the array of optical signal sources are imaged onto said input diffractive region by a first plurality of said lenses, ii) signals of the upstream wavelength transmitted by the optical fibers are imaged onto said output diffractive region by a second plurality of said lenses, and iii) signals of the downstream wavelength are optically coupled into the array of optical fibers by said second plurality of said lenses.

26. The optical module of claim 25 wherein said second substrate second surface further comprises a second source transmission window substantially transmissive to radiation of the downstream wavelength and substantially reflective to radiation of a second downstream wavelength.

27. The optical module of claim 26 wherein said third substrate further comprises a second input diffractive region, said second input diffractive region being proximate to said second source transmission window.

28. The optical module of claim 25 further comprising an array of signal paths disposed between said second plurality of lenses and the array of optical fibers.

29. The optical module of claim 25 wherein said diffractive optical element array has a transverse width substantially the same as the width of the array of photodetectors.

30. The optical module of claim 25 wherein said fourth substrate comprises a third plurality of said lenses for imaging signals of a second downstream wavelength onto said second input diffractive region.

* * * * *